United States Patent

[11] 3,548,089

[72] Inventors Toshihiko Takagi and Takashi Yamazaki, Kawasaki-shi, Japan

[21] Appl. No. 856,851
[22] Filed Sept. 10, 1969
Continuation of Ser. No. 568, 192, July 27, 1966, abandoned
[45] Patented Dec. 15, 1970
[73] Assignee Nippon Columbia Kabushikikaisha (Nippon Columbia Co. Ltd.) Tokyo, Japan a corporation of Japan

[54] COLOR VIDEO SIGNAL GENERATING DEVICE
1 Claim, 25 Drawing Figs.

[52] U.S. Cl. .......... 178/5.4
[51] Int. Cl. .......... H04n 9/06
[50] Field of Search .......... 178/5.4, 5.4STC, 5.2

[56] References Cited
UNITED STATES PATENTS
3,001,012 9/1961 Braicks .......... 178/5.4(STC)
3,291,901 12/1966 Takagi et al. .......... 178/5.4(STC)
3,378,633 4/1968 Macovski .......... 178/5.4(STC)

*Primary Examiner*—Richard Murray
*Attorney*—Hill, Sherman, Meroni, Gross & Simpson

ABSTRACT: A color video signal generating device which produces a color video signal from a real image recorded on a monochrome film. A color image is passed through filters which selectively filter various colors from the image and form a pattern on a monochrome film. The monochrome film is converted into a color video signal by the apparatus of the invention.

INVENTORS
Toshihiko Takagi
Takashi Yamazaki

BY Hill, Sherman, Meroni, Gross & Simpson ATTORNEYS

INVENTORS
Toshihiko Takagi
Takashi Yamazaki

BY Hill, Sherman, Meroni, Gross & Simpson ATTORNEYS

INVENTOR.
Toshihiko Takagi
Takashi Yamazaki

BY Hill, Sherman, Meroni, Gross & Simpson ATTORNEYS

INVENTORS
Toshihiko Takagi
Takashi Yamazaki

BY Hill, Sherman, Meroni, Gross & Simpson ATTORNEYS

INVENTORS
Toshihiko Takagi
Takashi Yamazaki

BY Hill, Sherman, Meroni, Gross & Simpson ATTORNEYS

COLOR VIDEO SIGNAL GENERATING DEVICE

This is a continuation of application Ser. No. 568,192, filed July 27, 1966, now abandoned.

This invention relates to a device for reproducing a color picture from a monochrome film, and more particularly to a device for reproducing color signals for television transmission from a monochrome film having recorded thereon black and white stripe patterns in accordance with primary color components of an object to be televised.

It has been the practice in the art to employ the so-called color film for color image reproduction in a television transmitter. As is well known, however, the color film is very expensive and its development requires considerably complicated processes, as compared with the monochrome film.

Accordingly, it is a primary object of this invention to provide a device for generating color video signals for television transmission through the use of a monochrome film having recorded thereon color information in the form of stripe patterns.

It is another object of this invention to provide a color video signal generating device having incorporated therein means for removing a harmful component produced in color information recorded in the form of stripe patterns in accordance with primary color components of an object to be televised.

It is still another object of this invention to provide a color video signal generating device having incorporated therein means for shifting adjacent horizontal scanning lines.

Briefly stated, the present invention resides in the provision of a device for reproducing a color picture from a monochrome film having recorded thereon color information, which is accomplished by the use of a television camera having a monochrome pickup tube or an interlaced-scanning type pickup tube and constructed in the following manner. This is based upon the arrangement in accordance with time or the periodicity of color information which is produced by horizontal scan of an electron beam over the film having recorded thereon color information in the form of stripe patterns formed by strip filter elements of a optical filter in accordance with color information contained in the output of the television camera. That is, the television camera has incorporated therein means for electrically decomposing the color information and producing a plurality of electrical signals corresponding to color elements necessary for color picture reproduction. With such an arrangement, a color picture of a televised object can be reproduced.

Other objects, features and advantages of this invention will be apparent from the following description taken in conjunction with the accompanying drawings, in which:

FIG. 1 is a diagram schematically illustrating one example of a photographic camera device according to this invention;

FIGS. 2A and 2B respectively illustrate a filter component employed in this invention;

Figure 11:
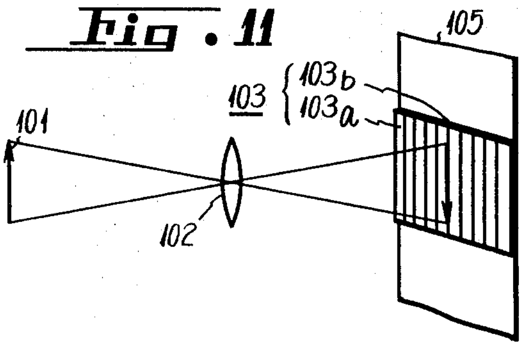
Figure 14:
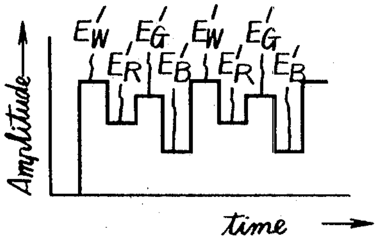
Figure 12:
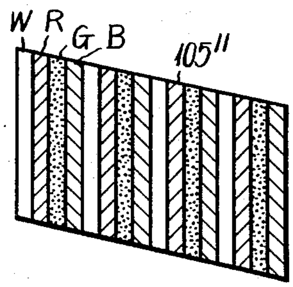
Figure 13:
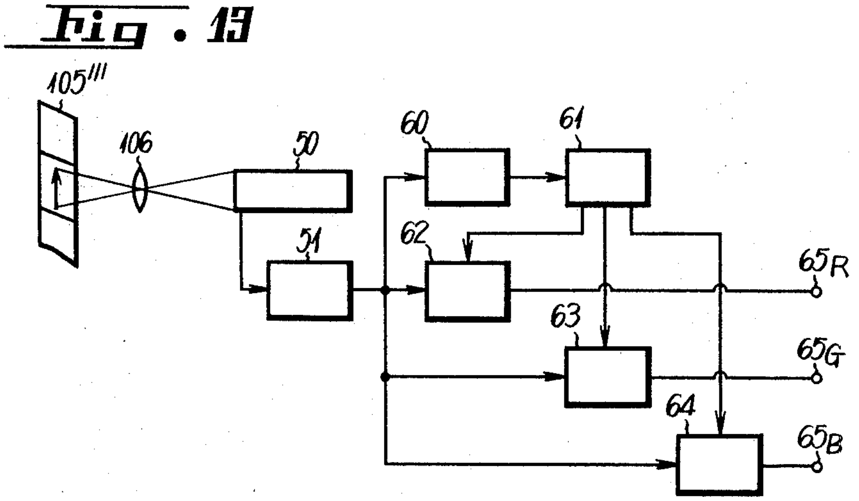
Figure 16:
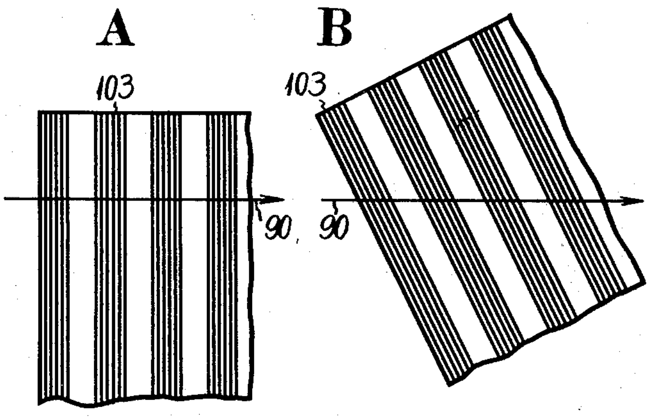
Figure 17:
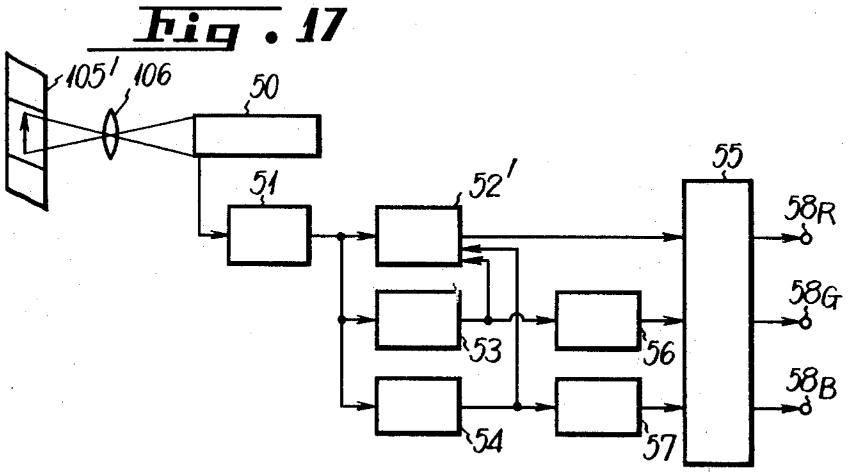
Figure 18:
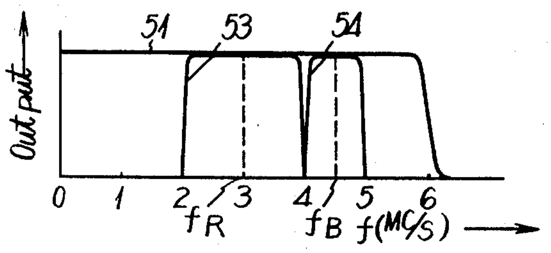

FIG. 11 schematically illustrates another example of the photographic camera device according to this invention;

FIG. 12 diagrammatically shows another example of the filter used in the photographic camera system of this invention;

FIG. 13 illustrates in block one example of the color signal generating device of this invention having incorporated therein the filter depicted in FIG. 12;

FIG. 14 is a schematic diagram showing an output waveform produced in the example shown in FIG. 13;

FIGS. 15A to D, inclusive, are waveform diagram, A showing a waveform obtained from that depicted in FIG. 13 and B, C and D gate pulses;

FIGS. 16A and 16B diagrammatically show filters, for explaining this invention;

FIG. 17 is a block diagram showing another example of the color signal generating device of this invention; and FIG. 18 illustrates frequency characteristics of filters employed in the example depicted in FIG. 17.

As is well known in the art, reproduction of lights of various colors requires lights of at least three colors or the so-called three primary colors. In order to facilitate a better understanding of this invention, a description will now be given in connection with reproduction of color lights from an object to be televised by mixing the so-called three primary colors.

Figure 1:
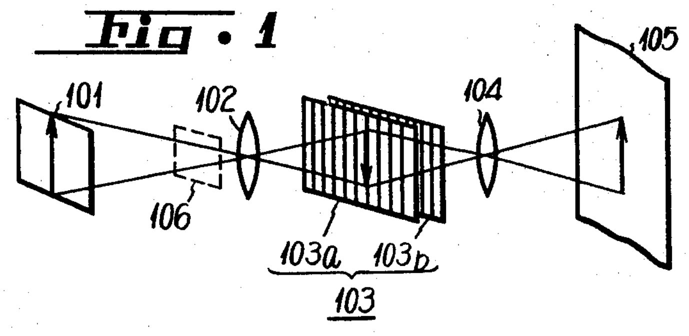

In FIG. 1, there is illustrated one example of the fundamental construction of a photographic camera of this invention. Reference numeral 101 indicates an object to be televised, 102 an objective lens, 103 an optical filter comprising filter components 103$a$ and 103$b$ which in turn consist of strip filter elements, the optical filter being disposed on a focusing plane on which the object 101 is focused into an image through the objective lens 102. Reference numeral 104 identifies a relay lens which projects to an unexposed monochrome film the real image focused on the focusing plane. For the sake of brevity, an iris diaphragm, a film feeding mechanism and so on are left out which are not necessary for explaining the principles of this invention. Further, the camera mentioned herein is inclusive of still and motion picture cameras. The unexposed monochrome film 105 after being exposed to light is subjected to necessary processing and then is projected, by suitable means described later, to a television transmitting apparatus of a circuit construction which features this invention.

Figure 2:
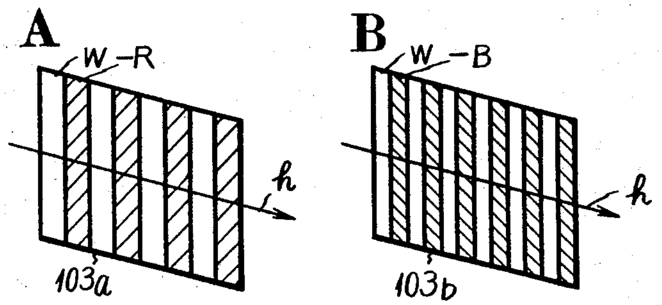

The optical filter 103 consists of the filter components 103$a$ and 103$b$, each having a construction such as depicted in FIG. 2. That is, the filter component 103$a$ comprises two kinds of strip filter elements W and −R arranged alternately and sequentially in the longitudinal direction thereof, the strip filter elements W being capable of transmitting light of substantially all wavelengths of visible rays and the strip filter element −R being capable of intercepting a certain color light, for example, red. The width of the filter elements W and −R can be selected as desired. The total width of a pair of adjacent strip filter elements W and −R is referred to as a "-pitch" in this specification. The arrangement and the pitch of the strip filter elements W and −R of the optical filter component 103$a$ are selected such that when the image of the object 101 on the film 105 is projected to a photoelectric conversion device, the stripe pattern of the filter component 103$a$ may cross the horizontal scanning direction $h$ of the photoelectric conversion device so as to produce video signals having a carrier frequency $fR$. The filter component 103$b$ comprises two kinds of strip filter elements W and −B arranged alternately and sequentially in a manner similar to the aforementioned elements W and −R, the strip filter elements W being the same as those mentioned above but the strip filter elements −B being capable of intercepting light of a certain color such, for example, as blue which differs from the color cut off by the strip filter elements −R. The arrangement and the pitch of these strip filter elements W and −B are selected such that when the image of the object 101 on the film 105 is projected to the photoelectric conversion device, the stripe pattern of the filter component 103$b$ may intersect the horizontal scanning direction $h$ of the photoelectric conversion device to produce video signals having a carrier frequency $fB$.

With such an arrangement, when the object 101 is focused into an image on the filter 103 by the objective lens 102, the filter component 103$a$ cuts off red light only, radiated from the object 101, in such a stripe pattern as to produce a video signal having the frequency $f_r$ and similarly the filter component **103*b* cuts off only blue light in such a stripe pattern as to produce the video signal frequency $f_b$. The filter component 103*a* does not exert any influence on light of all colors except red and the other filter component 103*b*** does not affect light of all colors except blue.

In this case, however, it is possible to employ, in place of the filter 103, such an optical filter that the image of an object to be televised is projected in a checkered pattern in accordance with the primary color components of the object.

Therefore, the picture image on the film 105, which is obtained by a camera having such a construction as shown in FIG. 1, is converted into a video signal E, as theoretically expressed by the following equation.

$$E=(E_W-k_RE_R-k_BE_B)-K_RE_R\cos\omega_Rt-K_BE_B\cos\omega_Bt \quad (1)$$

Figure 3:
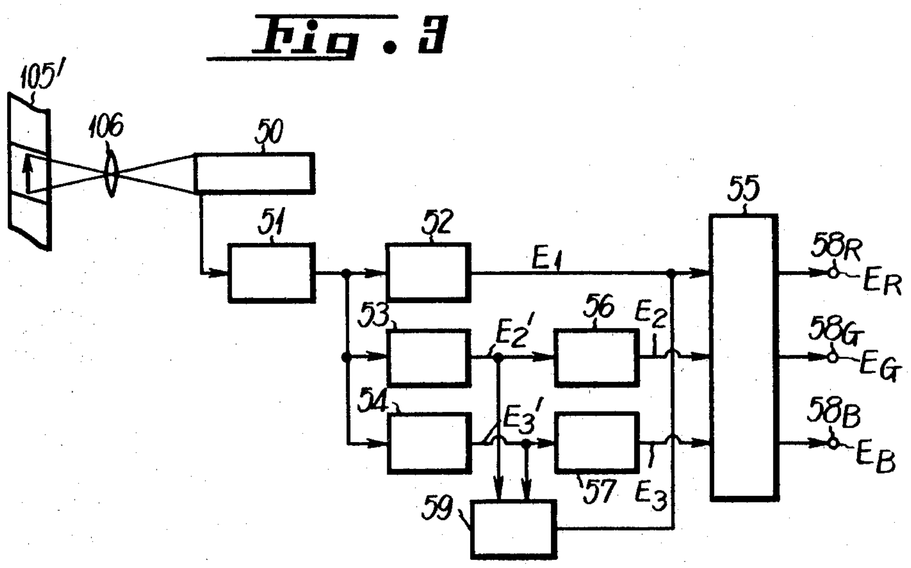
FIG. 3 is a block diagram illustrating one example of a color signal generating device according to this invention.

In this equation (1) $E_W$ represents a video signal corresponding to all visible light, $E_R$ and $E_B$ video signals corresponding to red and blue lights respectively, $K_r$ and $k_b$ constants dependent upon duty cycles of the stripe patterns of the filter components and spectral sensitivity of the film, and $K_R$ and $K_B$ constants dependent upon the above duty cycles spectral sensitivity and resolution characteristic of the system. In order to clarify the principles, higher harmonic components of $\omega_R$ and $\omega_B$ have been omitted. Now, a description will be given in connection with a system for producing color television signals from the film thus obtained. In FIG. 3, reference numeral 105′ designates a film obtained by processing the exposed film 105, and the image on the film 105′ is projected through a lens 106 to the photoelectric conversion layer of a pickup tube 50. Reference numeral 51 identifies an amplifier for amplifying the output of the pickup tube 50. The pickup tube 50 and the amplifier 51 may be constructed in substantially the same manner as those for usual monochrome television cameras. It will appear from the foregoing that the output of the amplifier 51 includes such a video signal as given by the equation (1).

Figure 4:
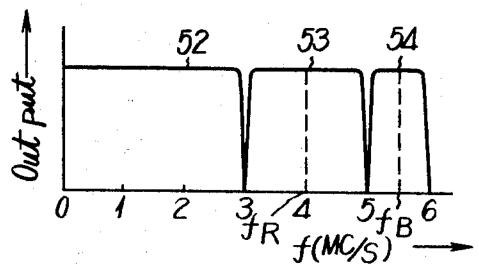
FIG. 4 is a diagrammatic showing of frequency characteristics of filters used in the example of FIG. 3.

The output of the amplifier 51 is fed respectively to a low-pass filter 52, a band-pass filter 53 having a center frequency $f_r$ and another band-pass filter 54 having a center frequency $f_b$. The characteristics of the filters 52, 53 and 54 are as illustrated in FIG. 4. The low-pass filter 52 serves to select the first term of the equation (1) and its output $E_1$ is a noncarrier signal such as given by the following equation.

$$E_1=E_W-k_RE_R-k_BE_B \quad (2)$$

The band-pass filter 53 serves to select the second term of the equation (1) and its output $E_2'$ is a carrier signal such as given by the following equation.

$$E_2'=K_RE_R\cos\omega_Rt \quad (3)$$

The band-pass filter 54 serves to select the third term of the equation (1) and its output $E_3'$ is a carrier signal such as expressed by the following equation.

$$E_3'=K_BE_B\cos\omega_Bt \quad (4)$$

Reference numerals 56 and 57 indicate detectors, which detect the outputs of the band-pass filters 53 and 54 respectively. Then, the outputs $E_2$ and $E_3$ of the detectors 56 and 57 are as follows:

$$E_2=K_RE_R \quad (5)$$

$$E_3=K_BE_B \quad (6)$$

Reference numeral 55 identifies a matrix circuit for computing the outputs $E_1$ of the low-pass filter 52 given by the equation (2) and the outputs $E_2$ and $E_3$ of the detectors 56 and 57 given by the equations (5) and (6) respectively.

Generally, $E_W$ is given as follows:

$$E_W=aE_R+bE_G+cE_B \quad (7)$$

Hence, signals $E_R$, $E_G$ and $E_B$ can be obtained respectively at output terminals 58R, 58G and 58B of the matrix circuit 55. In the equation (7) *a*, *b* and *c* represent constants dependent upon wavelength sensitivity of the film 105 and so on. If necessary, it is possible to dispose a color optical filter 106 shown in dotted line in the optical path of the camera shown in FIG. 1, so as to change the values of the constants *a*, *b* and *c* and the aforementioned constants $K_R$ and $K_B$.

The principles of this invention will be understood from the foregoing, but some additional matters will hereinbelow be described. There is often produced in the output of the amplifier 51 a beat frequency between $\omega_R$ and $\omega_B$ due to cross modulation which results from nonlinear characteristics present in the pickup tube 50, the amplifier 51 and the like. Of the beat frequency components, a particular component given by the following equation is contained, in practice, in the pass band of the low-pass filter 52 illustrated in FIG. 4 and these beat frequency component appears in the output of the low-pass filter 52 in the form of an unnecessary signal.

$$KE_RE_B\cos(\omega_B-\omega_R)t \quad (8)$$

where K is a constant. To avoid this unnecessary signal, a beat frequency generator 59 is provided, to which are applied the outputs of the band-pass filters 53 and 54, namely the carrier components $E_2'$ and $E_3'$ expressed by the equations (3) and (4), thereby producing a beat frequency component such as follows:

$$-KE_RE_B\cos(\omega_B-\omega_R)t \quad (9)$$

The beat output thus produced is added to the output of the low-pass filter 52, which results in cancellation of the unnecessary signal contained in the output of the low-pass filter 52 and given by the equation (8).

A description will hereinafter be made, in connection with an embodiment of the bandwidth of a video signal which is reduced into its color components.

It is known that the visual color characteristic has maximum resolution for monochrome information and that the resolution varies with the chromaticity of color information. Accordingly, if a bandwidth of 3 Mc/s, the broadest one in FIG. 4, is given to the filter 52 for obtaining the signal $E_1$ of the equation (2) from the signals of the equation (1), a bandwidth of 2 Mc/s (± 1 Mc/s) is given to the filter 53 for obtaining a red color signal of a relatively high resolution, namely the signal $E_2'$ of the equation (3), and a bandwidth of 1 Mc/s (± 0.5 Mc/s) is given to the filter 54 for obtaining a blue color component voltage of a relatively low resolution, the center frequencies $f_r$ and $f_b$ of the filters 53 and 54 become 4 Mc/s and 5.5 Mc/s respectively.

Figure 5:
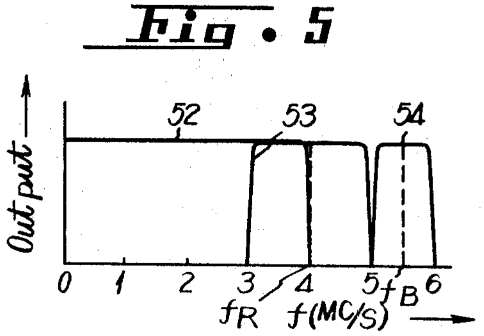
FIG. 5 illustrates a similar frequency characteristics of the filters but partly overlapping.

FIG. 5 illustrates the case in which when the entire bandwidth is 6 Mc/s, a high apparent resolution is to be obtained in the same manner as in FIG. 4. That is, the upper limit frequency of the band of the filter 52 is raised approximately up to the center frequency $f_r$ of the filter 53 and the bandwidth of the filter 52 is set at about 4 Mc/s. The bandwidths of the other filters 53 and 54 are the same as in FIG. 4. It will be apparent that the bandwidth of the filter 52 is extended while the bandwidths of the filters 53 and 54 may be further narrowed so as particularly to effect omission of color information of details.

It is useful, in enhancing an apparent resolution, to overlap one portion of the band of the filter 52 in the band of the filter 53 as described above referring to FIG. 5. However, the component of the filter 53 gets mixed in the output voltage $E_1$ of the filter 52 and, as a result of this, a stripe pattern due to $f_r$ appears in the reproduced picture and becomes a harmful component.

Figure 6:
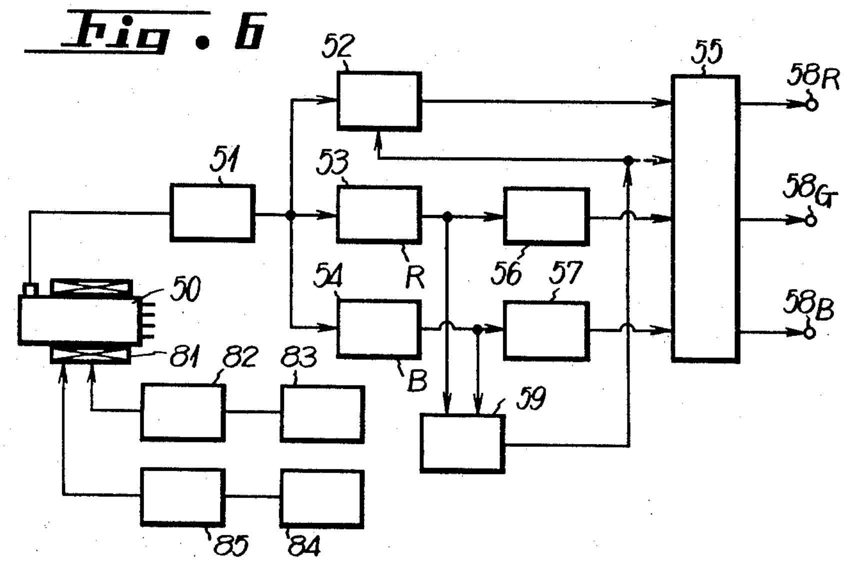
FIG. 6 illustrates in block another example of the color signal generating device according to this invention.
Figure 7:
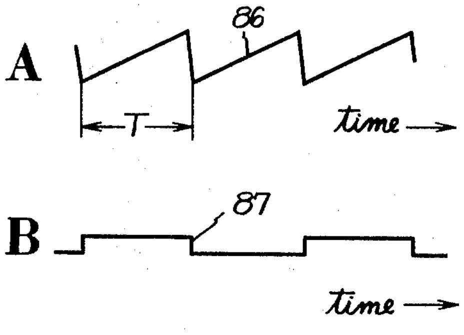
FIGS. 7A and 7B show waveforms of currents employed in the example of FIG. 6.

Referring now to FIGS. 6 and 7, a description will be given in connection with means for removing such a harmful component. In FIG. 6 there is illustrated an example in which the circuit of FIG. 3 has incorporated therein an additional circuit for preventing occurance of the harmful component. In this FIG. parts corresponding to those in FIG. 3 are identified at the same reference numerals and no further explanation will be made. The pickup tube 50 is illustrated having a horizontal deflection coil 81. The horizontal deflection coil 81 has connected thereto a horizontal deflection output circuit 82 as usual, which is driven by a horizontal synchronizing signal circuit 83 in synchronism therewith. Reference numeral 84 indicates a vertical synchronizing circuit for a vertical deflection coil (not illustrated) of the pickup tube 50.

Figure 8:
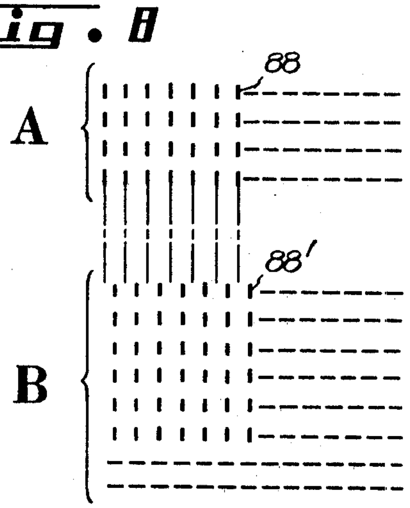
FIGS. 8A and 8B are explanatory diagrams for the example shown in FIG. 6.

In order to eliminate the harmful component resulting from the stripe pattern due to $f_r$ appearing in the reproduced picture, there is provided a circuit 85 which is driven by the output of the vertical synchronizing signal circuit 84 and produces a rectangular current shown in FIG. 7B. This output of the circuit 85 is applied to, for example, the horizontal deflection coil 81, being superimposed on the horizontal deflection output of the circuit 82. The rectangular signal will be apparent from the following description. In FIG. 7A, there is illustrated in the form of a sawtooth current 86 the output current which is fed to the vertical deflection coil from the vertical deflection output circuit (not illustrated) which is driven by the vertical synchronizing signal circuit 84. The period T of the sawtooth current is equal to that of one field of the reproducing device or the pickup tube. The rectangular current 87, which is produced by the circuit 85 as shown in FIG. 7B, turns "on" and "off" every field period T of the vertical synchronizing signal. This is a rectangular current. It will be seen that addition of the rectangular current to the horizontal deflection coil causes the picture of one field to shift in a horizontal direction. Therefore, the amplitude of this rectangular current is determined such that the stripe patterns will appear interleaved between adjacent ones of the other field, being shifted in the horizontal direction approximately half pitch of the stripe patterns. That is, if the stripe patterns 88 such as illustrated in FIG. 8A appear in the duration of one field during which the rectangular signal 87 is off to the horizontal deflection coil 81, the distance of the shift of the stripe pattern of the following field is determined such that the stripe patterns 88' appear between adjacent stripe patterns 88 as illustrated in FIG. 8B. The distance of the shift is usually selected such that the stripes 88' of the following one field appear between the adjacent stripe pattern 88 of the preceding field. Thus, the positions of the stripe patterns of each field in the reproduced picture are not fixed to an observer, and hence the effect of the stripe pattern can be effectively reduced. With reference to FIGS. 6 to 8 the foregoing has been given in connection with the rectangular current generating circuit which is driven by a vertical synchronizing signal. However, the same results can be produced in a different manner. That is, the rectangular current generating circuit 85 is driven by the horizontal synchronizing signal circuit 83, producing a rectangular current. The period of thus obtained rectangular current is made to agree with that of the horizontal deflection current. Its amplitude is determined to be such a value as mentioned above and its phase is inverted every vertical deflection period. In addition, it is also possible to apply a rectangular current to another coil provided around the pickup tube 50, without being restricted to the case where the rectangular current is fed to the horizontal deflection coil. Furthermore, in the case where the pickup tube is of an electrostatic deflection type, the aforementioned unnecessary component may essentially be cut off by applying the rectangular voltage to a deflection plate. It is also possible to feed a rectangular current to a reproducing device, namely the receiver pickup tube, without being limited to the above case of application of the rectangular current to the deflection means of the receiver pickup tube.

Figure 9:
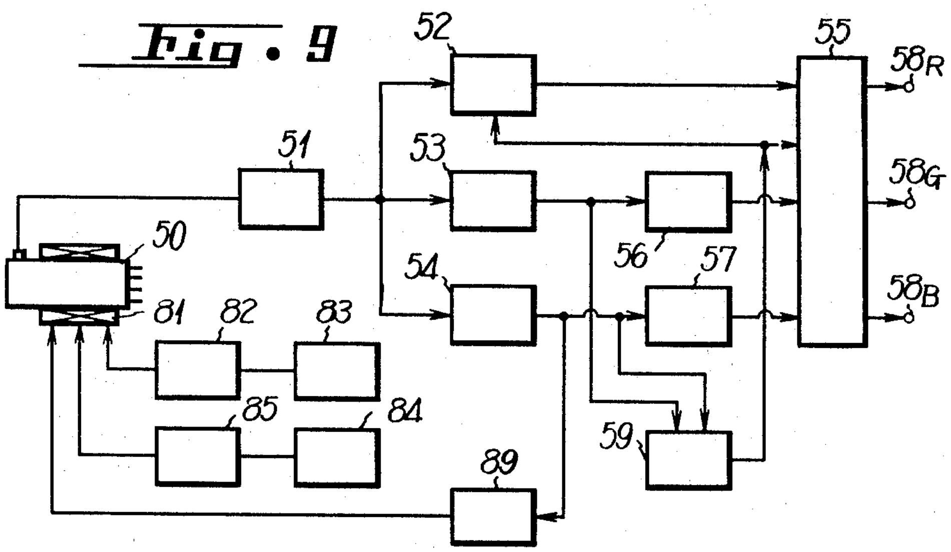
FIG. 9 is a block diagram illustrating still another example of the color signal generating device according to this invention.

Further, there are provided means for cutting off the variations in $f_r$ and $f_b$ which are added to or obtained from the filters 53 and 54 in FIG. 3. With variations in the horizontal scanning amplitude or linearity of a signal from the horizontal deflection output circuit 82 in FIG. 6, there are caused deviations in the frequencies $fR$ and $f_b$ of the signals applied to the filters 53 and 54. As a result of this, the frequencies exceed the bandwidths of the filters 53 and 54 or the characteristics within their bandwidths becomes uneven. This results in distortion of the reproduced picture and deterioration of picture quality. To avoid this, in the circuit of, for example, FIG. 6 the output of either one of the filters 53 and 54 (the filter 54 in this FIG. ) is applied to a frequency discriminator 89, as illustrated in FIG. 9, thereby discriminating the deviations in the frequency $f_b$. Thus discriminated output is then fed to, for example, the horizontal deflection coil 81 of the pickup tube 50. In this FIG. parts corresponding to those in FIG. 6 are designated at the same reference numerals for the sake of brevity. In this case, it is of course possible to apply the output of the discriminator 89 to the horizontal synchronizing circuit or to the horizontal deflection output circuit 82. It is a matter of course to apply the output of the discriminator in such a direction as to cancel the deviations in the frequency component which is obtained in the pickup tube.

Figure 10:
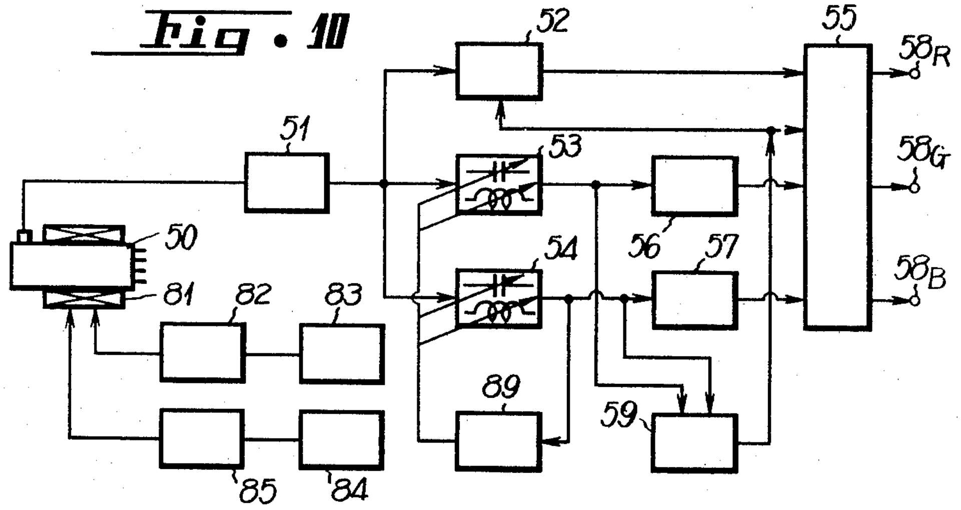
FIG. 10 is a block diagram, similar to FIG. 9, illustrating a further example of the color signal generating device according to this invention.

In place of this, other means can be employed for achieving the purpose. That is, it discriminates the deviations in the frequency components applied to the filters 53 and 54, as described above with FIG. 9, thereby changing the electrical constants of the filter 53 and/or the filter 54. Consequently, the center frequency of the filter 53 and/or the filter 54 is altered in response to the shift of the center frequency of the signal applied to the filters 53 and/or the filter 54, and hence the signal can be accurately passed over the entire bandwidth. Therefore, it is possible to provide the filter 53 and/or the filter 54 with a variable element such, for example, as a variable inductance or capacitor, as illustrated in FIG. 10, and its moving element is controlled by the output of the discriminator. In some cases, the band of the filter 52 can be made variable.

In FIG. 11 there is illustrated an example of the photographic camera device of this invention, different from that shown in FIG. 1. In FIG. 1, it is regarded that the place of the optical filter 103 is made to be substantially in close contact with the sensitive surface of the film 105 by the relay lens 104. Therefore, the film 105 can be located in direct contact with the optical filter 103 immediately behind it, as illustrated in FIG. 11, so that the relay lens 104 may be left out. Further, it will be apparent that with the use of an optical image transmitter such as an optical fibre the film 105 can be placed at such a location as to equal to that immediately behind the filter 103. Thus, the relay lens 104 such as shown in FIG. 1 can be omitted, so that the entire photographic camera device can be simplified.

FIG. 12 illustrates an optical filter 105'' which can be substituted for the aforementioned optical filter 103. As clearly seen from the FIG., the optical filter comprises four different strip filter elements W, R, G and B sequentially arranged in a manner similar to that in FIG. 2, the strip filter elements W being capable of transmitting visible light of all colors, the strip filter elements R being capable of transmitting light of one color, for example, red the strip filter elements G being capable of transmitting light of a different color, for example, green and the strip filter elements B being capable of transmitting light of a color different from the aforementioned ones, for example, blue.

FIG. 13 illustrates in block a color video signal generating device for use with a film having recorded thereon real images of an object to be televised and the stripe patterns of such an optical filter as described previously. Reference numerals 106, 50 and 51 indicate a lens, a pickup tube and an amplifier which are substantially the same as those in FIG. 1. Reference numeral 105''' identifies a film which has a real image of an object to be transmitted and the stripe pattern of the optical filter 105''. In this case, the amplifier 51 produces such an output as illustrated in FIG. 14, which is composed of time-division signals $E_W'$, $E_R'$, $E_G'$ corresponding to the strip filter elements W, R, G and B of the optical filter 105'' depicted in FIG. 12.

Figure 15:
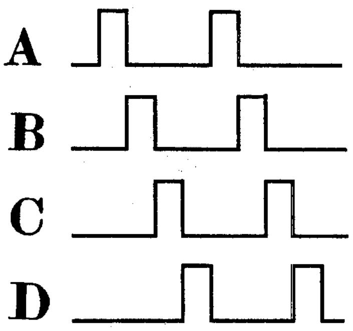

In FIG. 13 reference numeral 60 designates a waveform separating circuit which separates the output $E_W'$ from the waveform shown in FIG. 14 and produces a waveform depicted in FIG. 15A, just like a synchronizing signal separating circuit of a conventional television receiver. Reference numeral 61 indicates a multiphase pulse generator, which has applied thereto the pulse shown in FIG. 15A and produces gate pulses such as illustrated in FIGS. 15B, 15C, and 15D. These pulses are fed to gate circuits 62, 63 and 64 respectively, thereby opening them. At the same time, the output of the amplifier 51 applied respectively to them is gated. As a result of this, the outputs of the gate circuits 62, 63 and 64 are proportionate to those $E_R'$, $E_G'$ and $E_B'$ shown in FIG. 14. That is, there are obtained at terminals 65R, 65G and 65B outputs in proportion to the aforementioned outputs $E_R'$, $E_G'$ and $E_B'$, thus achieving the desired purpose.

With the above device, however, there is a possibility that when detail components resembling the pitch of the striped filter are present in the image picture of an object to be televised, a moire pattern is produced in the reproduced picture on the receiver screen. To avoid this, it is preferred to locate in the light path between the optical filter and the object to be televised an optical element capable of limiting the resolution for the object, such as, for example, a glass plate having a suitable rough surface.

In order to change the ratio of each color component of the real imaged focused on the film 105, it is possible to employ means for changing the duty cycle of the stripe-patterned filter.

In the photographic camera depicted in FIG. 1, the pitch of the filter to be located in front of or on the film 105 is selected such that the center frequencies of the band-pass filters 53 and 54 are of the aforementioned values. In some cases, however, it is required to change the bandwidths and center frequencies. This may be accomplished by changing the pitch of the optical filter. However, it is difficult in practice to change the pitch of the optical filter as desired at any time and in addition it is quite impracticable to change the pitch by small amounts. Therefore, means is required for changing the center frequencies of the bands without changing the pitch of the optical filter. For this purpose, the filter is disposed in such a manner that the longitudinal direction of the strip filter elements differs from that shown in FIG. 16A, relative to the direction of the horizontal scanning of an electron mean as illustrated in FIG. 16B. In such a case, the relative velocity of the horizontal scanning by the electron beam identified at 90 is different from that in FIG. 16A, and if this difference is predetermined according to the center frequency of the band-pass filter, thereby achieving the purpose.

FIG. 17 illustrates another example of the color signal generating device of this invention, in which reference numerals 105', 106, 50, 51, 53, 54, 55, 56 and 57 indicate the same elements as those in FIG. 13. The feature of the device system in FIG. 17 lies in the provision of an adding circuit 52'. It is apparent that bandwidth of the amplifier 51 includes those of the filters 53 and 54 as shown in FIG. 18. Since the outputs of the filters 53 and 54 are as given by the equations (3) and (4), the outputs are applied to the adding circuit 52' before being fed to the detectors 56 and 57 and the outputs and that of the amplifier 51 given by the equation (1) are added together. At this time, the polarities and amplitudes of the outputs of the band-pass filters are determined in such a manner that the corresponding components contained in the outputs of the filters 53 and 54 and the amplifier 51, namely the second and third terms of the equation (1) may be canceled. Thus, the adding circuit 52' may perform the function of the low-pass filter in FIG. 3, and further frequency components exceeding the pass bands of the filters 53 and 54 can be obtained, so that resolution can be enhanced. It is, of course, possible in this example to use various additional means described with the system shown in FIG. 3.

We claim:

1. A color video signal generating device comprising a monochrome film having recorded thereon a real image of an object and stripe patterns, said real image and stripe patterns being formed by a camera device having a stripe filter disposed between said object and said monochrome film, said stripe filter having stripe patterns of different pitches respectively depending upon the primary color components whereby the pitches of said stripe patterns recorded on said monochrome film respectively depend upon the primary color components, a photoelectric conversion device for converting said real image and said stripe patterns recorded on said monochrome film into electrical signals, said electrical signals consisting of modulated signals and nonmodulated signals and being produced when said real image and said stripe patterns are scanned by the horizontal scanning line of said photoelectric conversion device in such a manner that said horizontal scanning line intersects said real image and said stripe patterns, band-pass filters for separating said modulated signals from said electrical signals, and adder circuit receiving the outputs of said band-pass filters and of said photoelectric conversion device for separating said nonmodulated signals from said electrical signals, detectors receiving the outputs of said band-pass filters for detecting the outputs of said band-pass filters, and a matrix circuit receiving the outputs of said detectors and of said adder circuit, whereby color video signals are respectively obtained from the outputs of said adder circuit and said detectors and modulated signal components contained in the output of said photoelectric conversion device are canceled.

UNITED STATES PATENT OFFICE

CERTIFICATE OF CORRECTION

Patent No. 3,548,089 Dated December 15, 1970

Inventor(s) Toshihiko Takagi and Takashi Yamazaki

It is certified that error appears in the above-identified patent and that said Letters Patent are hereby corrected as shown below:

Column 2, line 58, read "fR" as -- $f_R$ --; line 72, read "fB" as -- $f_B$ --;

Column 3, line 1, read "produced a" as -- produce the --; line 2, read "$f_r$" as -- $f_R$ --; line 4, read "$f_b$" as -- $f_B$ --; line 22 read "$K_r$ and $k_b$" as -- $k_R$ and $k_B$ --; line 42, read "$f_r$" as -- $f_R$ --; same line, read "$f_b$" as -- $f_B$ --;

Column 4, line 50, read "$f_r$" as -- $f_R$ --; same line, read "$f_b$" as -- $f_B$ --; line 56, read "$f_r$" as -- $f_R$ --; line 66, read "$f_r$" as -- $f_R$ --;

Column 5, line 9, read "$f_r$" as -- $f_R$ --; line 69, read "$f_r$ and $f_b$" as -- $f_R$ and $f_B$ --; line 73, read "fR and $f_b$" as -- $f_R$ and $f_B$ --;

Column 6, line 7, read "$f_b$" as -- $f_B$ --;

Column 7, line 42, read "mean" as -- beam --;

Column 8, line 1, read "Fig. 13" as -- Fig. 3 --; and line 49, (claim 1), read "canceled" as -- cancelled --.

Signed and sealed this 15th day of February 1972.

(SEAL)
Attest:

EDWARD M.FLETCHER,JR.
Attesting Officer

ROBERT GOTTSCHALK
Commissioner of Patents

FORM PO-1050 (10-69)